United States Patent
Zargari et al.

(10) Patent No.: US 7,511,976 B2
(45) Date of Patent: Mar. 31, 2009

(54) SELF POWERED SUPPLY FOR POWER CONVERTER SWITCH DRIVER

(75) Inventors: Navid Reza Zargari, Cambridge (CA); Bin Wu, Toronto (CA); Weiqian Hu, Toronto (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 323 days.

(21) Appl. No.: 11/426,663

(22) Filed: Jun. 27, 2006

(65) Prior Publication Data

US 2007/0297202 A1 Dec. 27, 2007

(51) Int. Cl.
*H02H 7/10* (2006.01)
(52) U.S. Cl. ............... 363/50; 363/56.12; 361/91.7; 361/100
(58) Field of Classification Search ............ 363/50, 363/52, 53, 54, 55, 56.12, 132; 361/91.7, 361/91.8, 100, 57; 323/266, 901, 908; 327/428, 327/434, 436, 440
See application file for complete search history.

(56) References Cited

U.S. PATENT DOCUMENTS

| | | | |
|---|---|---|---|
| 4,542,440 A * | 9/1985 | Chetty et al. ............. 361/111 |
| 5,424,937 A | 6/1995 | Iyotani et al. |
| 5,483,192 A | 1/1996 | Tai |
| 5,796,599 A | 8/1998 | Raonic et al. |
| 5,982,646 A * | 11/1999 | Lyons et al. ............. 363/58 |
| 6,351,397 B1 * | 2/2002 | Sawa et al. ............. 363/50 |
| 6,366,483 B1 * | 4/2002 | Ma et al. ............. 363/87 |
| 6,396,672 B1 | 5/2002 | Deam |
| 6,417,719 B1 | 7/2002 | Deam |
| 6,493,242 B1 * | 12/2002 | Riggio et al. ............. 363/16 |
| 6,710,994 B1 | 3/2004 | Deam |
| 2003/0103360 A1 * | 6/2003 | Hatta et al. ............. 363/17 |

OTHER PUBLICATIONS

Dusan M. Raonic, "SCR Self-Supplied Gate Driver for Medium-Voltage Application with Capacitor as Storage Element", IEEE Transaction on Industry Applications, vol. 36, No. 1, Jan./Feb. 2000.
Dusan M. Raonic, "SCR Self Supplied Gate Driver for Medium Voltage Application with Capacitor as Storage Element", IEEE Industry Applications Conference, Thirty-Third IAS Annual Meeting, Oct. 1998.
Dusan Raonic, Dave Maclennan, Didier Rouaud, "Some Experience with SCR's Self Powered Gate Driver System for Medium Voltage Solid State Starter", IEEE Canadian Conference on Electrical and Computer Engineering Conference (CCECE), Sr. John's, Newfoundland, Canada, May 25-28, 1997.
Power Integrations, "TOP242-250 TOPswitch-GX Family Application Notes", Nov. 2005.
B. Odegard, R. Ernst, "Applying IGCT Gate Units", ABB Application Note 5SYA 2031, Dec. 2002.

\* cited by examiner

*Primary Examiner*—Akm E Ullah
*Assistant Examiner*—M'Baye Diao
(74) *Attorney, Agent, or Firm*—Fay Sharpe, LLP; Alexander R. Kuszewski

(57) ABSTRACT

Self-powered supplies are presented for powering a power converter switch driver with power obtained from an associated snubber circuit, in which a supply circuit and a snubber circuit are connected in a series path across the switch terminals with the supply circuit receiving electrical power from the snubber and providing power to the switch driver.

20 Claims, 4 Drawing Sheets

SELF POWERED SUPPLY FOR POWER CONVERTER SWITCH DRIVER

FIELD OF THE INVENTION

The present invention relates generally to electrical power conversion and more particularly to self-powered switch driver systems for power converters.

BACKGROUND OF THE INVENTION

Power conversion systems are employed to convert electrical power from one form and/or level, whether AC or DC, to another (AC or DC) in a multitude of applications. One example is a pulse width modulated (PWM) current source rectifier used in high-power motor drives with AC input power being selectively switched to create a DC output bus voltage from which a load is driven. Power converters may include multiple stages for different types of conversion applications, such as AC/DC/AC drives for electric motors, in which input AC power of a given frequency and voltage is first converted to a DC bus, with a second stage selectively switching the DC bus power to create single or multi-phase AC output power of variable voltage and/or frequency. This type of converter is particularly useful in driving electric motors in industrial applications requiring variable speed control with varying motor load situations. In the controlled switching of the input and output power in one or more converter stages, high voltages and currents are experienced by the power switches, wherein semiconductor-based switches such as silicon controlled rectifiers (SCRs), gate turn-off thyristors (GTOs), gate commutated thyristors (GCTs), etc. are typically used to switch the power at relatively high frequencies. The control terminals or gates of these switching devices require gate driver circuits to generate the switch signals for actuating the power switch for controlled operation in power conversion applications, wherein GCTs typically have an external gate driver and integrated gate commutated thyristors (IGCTs) have a driver circuit integrated with the GCT power switch. In high voltage power conversion applications, the gate driver circuit needs to be operated with power that is isolated from the system ground since the input and output voltages may be several thousand volts or more. Conventional power converts often employ separate isolated DC power sources for powering the gate driver circuits. However, these driver power sources and isolation transformers occupy valuable space and add significant cost in power conversion systems, particularly for medium or high voltage systems operated with GCT or IGCT type switches. Thus, there remains a need for improved power conversion systems and gate driver power sources by which isolated gate driver power can be provided in a cost efficient manner without adding large external power sources.

SUMMARY OF INVENTION

Various aspects of the present invention are now summarized to facilitate a basic understanding of the invention, wherein this summary is not an extensive overview of the invention, and is intended neither to identify certain elements of the invention, nor to delineate the scope thereof. Rather, the primary purpose of this summary is to present some concepts of the invention in a simplified form prior to the more detailed description that is presented hereinafter. The goal of reducing the cost and size of power conversion systems is addressed through the provision of a self-powered supply (SPS) that obtains energy from the snubber circuit associated with a power switching device and generates an isolated dc voltage for the gate driver. The SPS and the snubber form a series circuit between the switch device terminals such that the snubber circuit will transfer charging currents to a storage device in the SPS from which the switch driver power is derived. In this manner, the driver power is obtained from the energy accumulated by the snubber and is isolated with respect to the system ground and the snubber voltage, thereby saving space and cost in the construction of power conversion systems such as motor drives, etc.

In accordance with one or more aspects of the invention, power conversion systems and switch circuits thereof are provided for controlled conversion of electrical power. The switch circuit is operable in a power converter to selectively control conduction of current between first and second converter circuit nodes, wherein the conversion system may include a plurality of such switch circuits to accomplish a given power conversion task. The switch circuits individually comprise a switching device, a switch driver, a snubber circuit, and a supply circuit, with the snubber and the supply circuit being connected in a series path across the switch terminals. The switching device may be any form of electrical power switch, such as semiconductor-based GCT devices, etc., having first and second switch terminals coupled with the first and second circuit nodes, as well as one or more gates or other control terminals that selectively operate the switch in one of a conductive state and a nonconductive state according to a switching signal provided at the control terminal in order to control the conduction of current between first and second circuit nodes. The switch driver includes an output terminal coupled with the switch control terminal, as well as one or more power terminals for receiving power from the supply circuit. In operation, the switch driver provides the switching signal to the switching device according to a received switch control signal using the power provided at the power terminal. The snubber circuit comprises a snubber storage device such as a capacitor and includes first and second snubber terminals, one of which is coupled with a circuit node and the other being coupled to the supply circuit. The supply circuit includes a supply storage device, such as a capacitor, and an output coupled with the switch driver power terminal to provide electrical power from the supply storage device to the switch driver for operation thereof. The supply circuit also has first and second input terminals with one input terminal coupled with a circuit node and the other input terminal being coupled to the snubber such that the snubber circuit and the supply circuit form a series circuit between the first and second circuit nodes in parallel with the switching device.

In one implementation, the supply circuit is a dual stage design having first and second converters, with the first converter being coupled with the first and second supply circuit input terminals and comprising a capacitor storage device receiving charging current from the snubber circuit to provide a first converter output voltage at first and second output terminals of the first converter stage. The second converter stage in one embodiment may be a flyback converter or other regulated DC-to-DC converter coupled with the output terminals of the first converter to receive the first converter output voltage and providing the electrical power at the supply circuit output for powering the switch driver. In addition, the supply circuit may include isolation circuitry to electrically isolate the supply circuit output from the output terminals of the first converter. In another aspect of the invention, the charging of the supply storage device of the supply circuit by current from the snubber is independent of the polarity of voltage across the switching device. Furthermore, the switch driver and the switching device may be integrated (e.g., an IGCT, etc.), with the integrated switch driver obtaining power from the supply circuit.

BRIEF DESCRIPTION OF THE DRAWINGS

The following description and drawings set forth certain illustrative implementations of the invention in detail, which are indicative of several exemplary ways in which the principles of the invention may be carried out. The illustrated examples, however, are not exhaustive of the many possible embodiments of the invention. Other objects, advantages and novel features of the invention will be set forth in the following detailed description of the invention when considered in conjunction with the drawings, in which.

DETAILED DESCRIPTION OF THE INVENTION

Figures 1A, 1B:
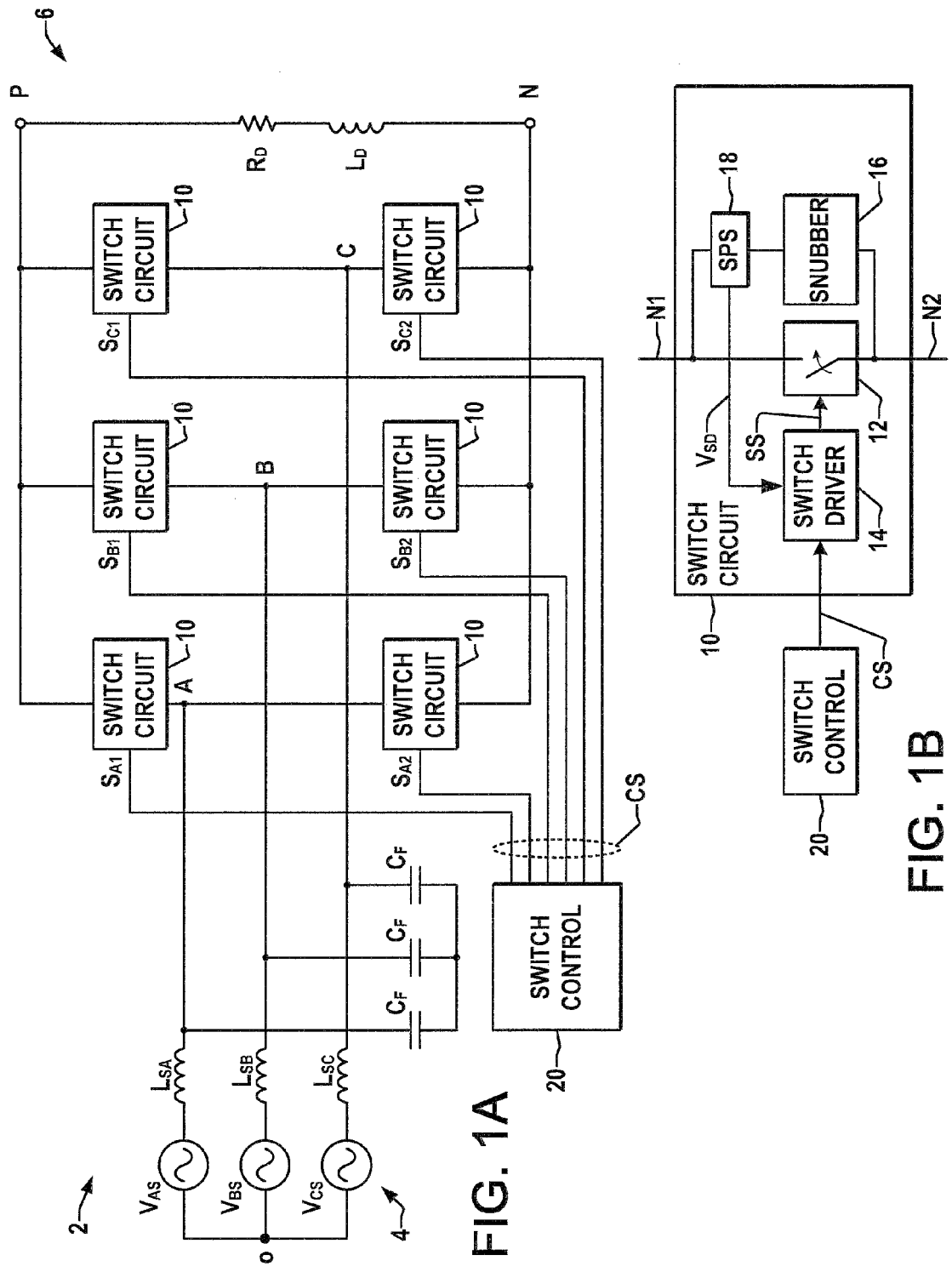
FIG. 1A is a schematic diagram illustrating an exemplary power conversion system with switch circuits in which one or more aspects of the invention are embodied.
FIG. 1B is a schematic diagram illustrating further details of the switch circuits of the power converter of FIG. 1A.

Referring now to the figures, several embodiments or implementations of the present invention are hereinafter described in conjunction with the drawings, wherein like reference numerals are used to refer to like elements throughout, and wherein the various features are not necessarily drawn to scale.

Referring initially to FIGS. 1A and 1B, FIG. 1A illustrates an exemplary power conversion system or power converter 2 having a plurality of self-supplied switch circuits 10 for controlled conversion of input electrical power to output electrical power in accordance with various aspects of the present invention. The exemplary power converters 2 and 102 illustrated herein are pulse width modulated (PWM) current source rectifiers (CSRs) finding utility in high-power drives for electric motors, and the various features of the present invention are illustrated and described hereinafter in this context. However, it will be appreciated that the invention may be advantageously employed in any type of single or multi-stage switched power conversion system, wherein the invention is not limited to the specifically illustrated examples.

The system 2 of FIG. 1A receives three phase AC input electrical power from a three phase source 4 at phase terminals labeled A, B, and C through optional source inductors $L_{SA}$, $L_{SB}$, and $L_{SC}$, respectively, where the voltages and currents provided by the source 4 may be of any values. The illustrated converter 2, moreover, includes a set of three input filter capacitors $C_F$, although not a requirement of the invention. The system includes six symmetrical switch circuits $S_{A1}$, $S_{B1}$, $S_{C1}$, and $S_{A2}$, $S_{B2}$, and $S_{C2}$ for selectively coupling the AC input phase lines A, B, and C with one of two DC bus output lines P and N according to switch control signals CS provided by a switch control system 20. The controlled provision of the signals CS causes the switching circuits 10 to create a DC output voltage at the terminals P and N of an output 4 for driving a load, illustrated in FIG. 1A as a resistor $R_D$ in series with an inductor $L_D$. The exemplary switch control system 20 provides PWM type signals CS at a generally constant switching frequency, although the invention is not restricted to any particular type or form of switching scheme.

As best shown in FIG. 1B, the individual switch circuits 10 include a switching device 12, a switch driver 14, a snubber circuit 16, and a supply circuit (e.g., self-powered supply or SPS) 18, arranged with the snubber 16 and the supply circuit 18 forming a series path across the switch 12. The switch circuit 10 provides terminals for connection to first and second circuit nodes N1 and N2, such as the input lines A, B, C, or output lines P, N of the converter system 2, with the switching device 12 connected between the circuit nodes N1 and N2 to selectively couple or decouple the nodes N1 and N2. The switch circuit 10 also has a control terminal to receive the switch control signal CS from the switching control system 20. The switch 12 can be any form of electrical power switch operable according to a switching signal SS to selectively allow or inhibit conduction of electrical current, such as SCRs GCTs, IGCTs, GTOs, etc. The switch 12 comprises a first switch terminal coupled with the circuit node N1 and a second terminal coupled to N2, as well as a gate or control terminal coupled to the output of the switch driver 14. The control terminal receives the switching signal SS from the driver 14 for controlled operation to place the switch 12 in either a conductive state or a nonconductive state so as to control the conduction of current between the circuit nodes N1 and N2. The switch driver 14 has an output terminal coupled with the switch control terminal at which the switching signal SS is provided according to a received switching control signal CS, and the driver 14 also includes at least one power terminal at which power is received from the supply circuit 18, indicated in FIG. 1B as a switch driver voltage $V_{SD}$. Unlike conventional power converters, therefore, the system 2 requires no separate supply bus or system to power the gate drivers 14 of the switch circuits 10, as these are self-powered by operation of the SPS 18 as described further below.

In regular operation in the power converter 2, the switching control system 20 provides switch control signals CS according to a pulse width modulation scheme taking into account a desired or setpoint output voltage or current and the current output condition, wherein the switching control system 20 preferably receives one or more feedback signals (not shown) and derives an appropriate switching pulse width or other switching pattern wherein the switching control signal is generally a pulse waveform provided at one of two distinct levels at any given time, with the pulse widths and timing provided so as to direct the converter output 6 to the desired or setpoint state. The switch driver 14 receives the control signal CS and provides the switching signal SS in accordance therewith so as to control operation of the switching device 12 using the voltage $V_{SD}$ provided at the power terminal(s). The snubber circuit 16 comprises at least one snubber storage device such as a capacitor or multiple capacitors, etc. and includes first and second snubber terminals. One snubber terminal is coupled in FIG. 1B to the supply circuit 18 and the other is coupled with the circuit node N2 whereby the SPS 18 and the snubber 16 form a series circuit connected in parallel with the switch terminals between the circuit nodes N1 and N2. In this configuration, the snubber 16 absorbs switching energy so as to protect the switch 12 and provides at least a portion of this snubber energy to the supply circuit 18 for powering the driver 14. The supply circuit 18 comprises a supply storage device, such as a capacitor, and provides an output $V_{SD}$ such as a regulated DC voltage to the power terminal of the switch driver 14 to provide electrical power from the supply storage device to the switch driver 14 for self-supplied switching of the circuit 10 without requiring external driver power. Moreover, certain preferred implementations of the supply circuit 18 include isolation components to provide the driver voltage $V_{SD}$ that is isolated with respect to the snubber voltages. The supply circuit 18 itself has first and second input terminals connected to the first circuit node N1 and to the snubber 16 so as to form a series circuit between the nodes N1 and N2 in parallel with the switch 12, wherein the exemplary switch circuit 10 of FIG. 1B is representative of the six switch circuits 10 in the converter 2 of FIG. 1A, and other conversion systems may employ any number of such switching circuits 10.

Figure 2:
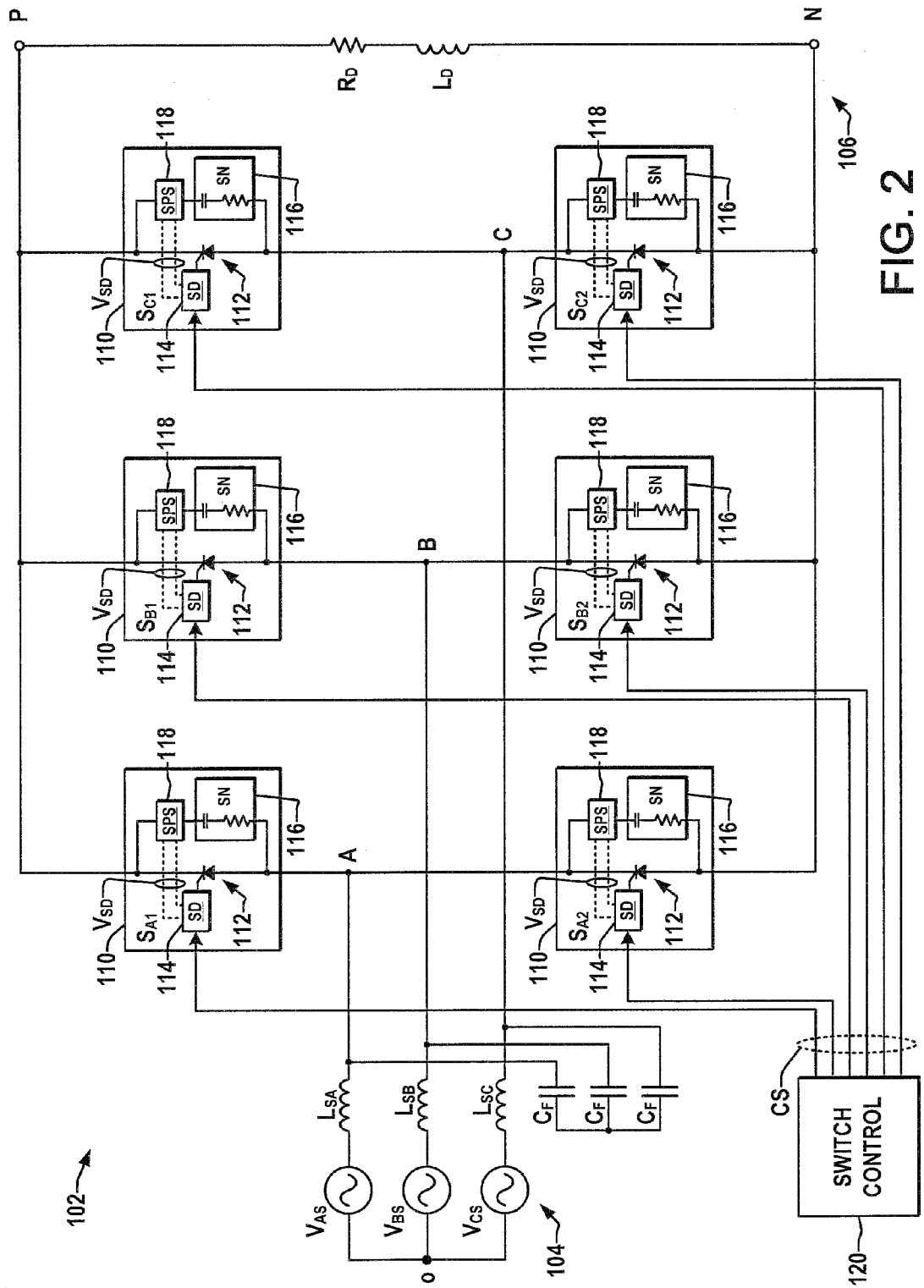
FIG. 2 is a schematic diagram illustrating another power conversion system comprising switch circuits according to the invention.

FIG. 2 illustrates another exemplary PWM current source rectifier 102 with self-powered switch circuits 110 in accordance with the invention, wherein the system 102 receives AC input power from an input source 104 and provides a controlled or regulated DC output 106 by provision of switching control signals CS from a switching controller 120. As shown in FIG. 2, the individual switch circuits 110 include a switching device 112 and a switch driver (SD) 114, along with a series connected combination of a snubber circuit 116 and a self-powered supply circuit (SPS) 118 similar to the switch circuit components shown in FIG. 1B, wherein the snubber circuits (SN) 116 in this example each comprise a snubber resistor and a snubber capacitor connected in series. The switch circuits 110 are operable according to control signals CS from the switching control system 120 which can implement any suitable switch control scheme such as pulse width modulation, etc. to generate a desired output 106 using power obtained from the input 104 with appropriate output feedback (not shown) for closed-loop regulation of the output 106 according to a desired setpoint value. In operation, the SPSs 118 are arranged in series with the snubbers 116, where the snubbers 116 transfer a small amount of energy stored in the snubber capacitor to the SPS 118 to provide a supply voltage $V_{SD}$ to the driver 114.

Figure 3:
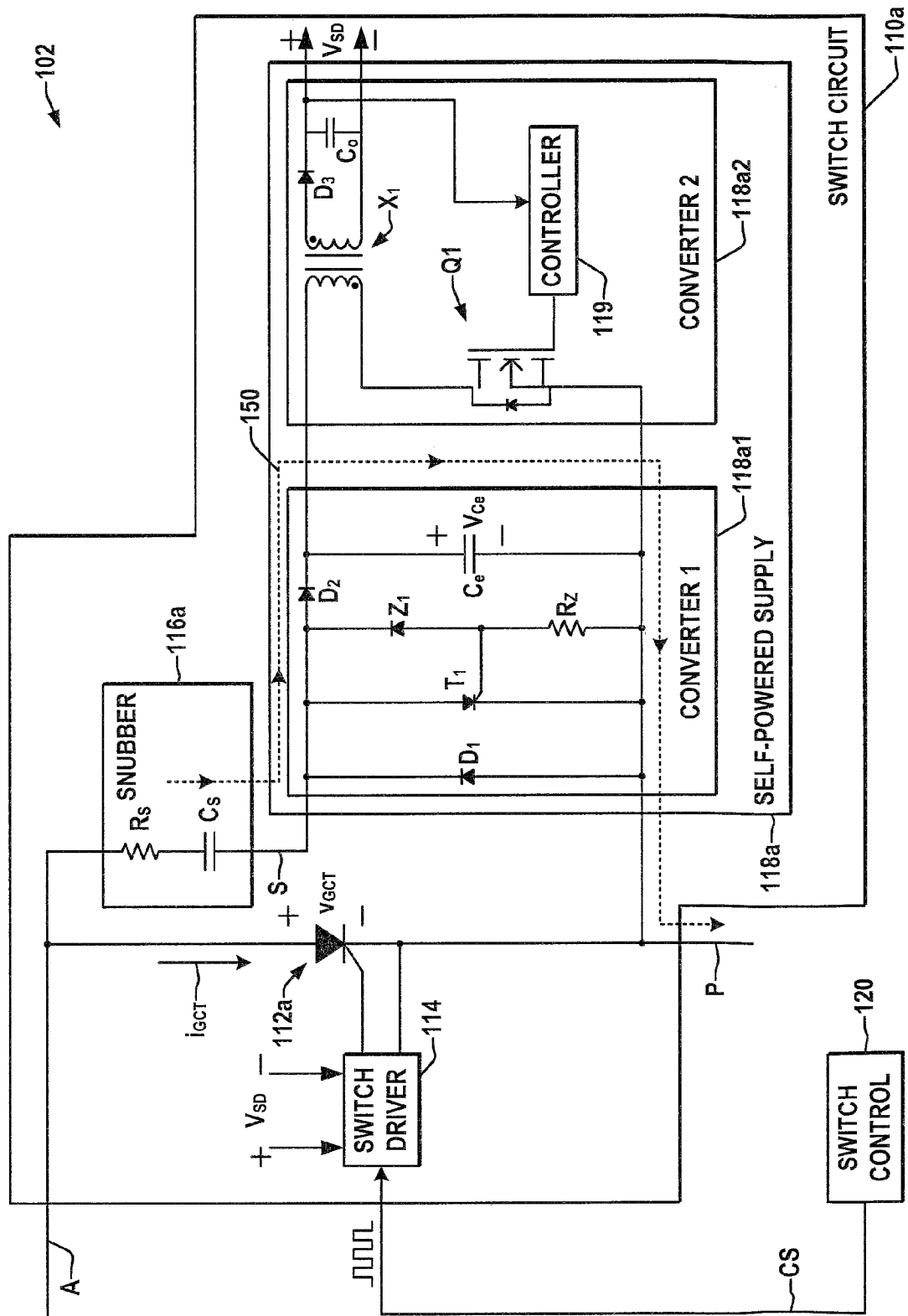
FIG. 3 is a schematic diagram illustrating further details of the exemplary switch circuits of FIG. 2, with a dual stage supply circuit providing power for the switch driver circuit using power derived from the snubber.

Referring also to FIG. 3, further details of an exemplary first switch circuit 110a are illustrated, which may be used in the system 102 of FIG. 2 or other power conversion systems. In the example shown in FIG. 3, the switch circuit 110a is coupled between converter circuit nodes A (AC input line A in FIG. 2) and P (DC output terminal P in system 102). The SPS 118a of the circuit 110a is a two-stage design which operates to convert energy transferred from the snubber circuit 116a into a regulated switch driver dc voltage $V_{SD}$ of about +/-20V in one example for driving a GCT type gate driver 114 to operate a GCT device 112a in a medium voltage converter 102 with operating voltages on the order of 5-10 kV. The SPS 118a also provides electrical insulation on the order of hundreds of volts between the snubber circuit 116a and the GCT gate driver 114 whereby the driver 114 can generate a positive gate voltage to turn the GCT switch 112a on (conductive state) or a negative gate voltage to turn the switch 112a off (nonconductive state). The exemplary SPS circuit 118a of FIG. 3 includes two converter stages 118a1 and 118a2. The first converter stage 118a1 operates to transfer energy stored in the snubber capacitor to an energy-storage capacitor $C_e$ in the first stage 118a1, wherein charging current from the snubber capacitor flows to charge the energy storage capacitor $C_e$ along the path 150 shown as a dashed line in FIG. 3, and where the capacitance values of the snubber capacitor and the supply storage capacitor $C_e$ are preferably selected in a given converter application so that a sufficient amount of energy is stored in the capacitor $C_e$ to provide the required output voltage $V_{SD}$ for proper operation of the GCT gate driver 114 in operating the switch 112a.

The first stage 118a1 is coupled with the snubber 116a and the circuit node P via first and second supply circuit input terminals with the upper terminal being connected to the lower snubber terminal at snubber node S and the lower terminal being connected to the output circuit node P. The first converter 118a1 comprises a capacitor storage device capacitor $C_e$ that receives charging current along path 150 from the snubber circuit 116a to provide a first converter output voltage $V_{Ce}$ at first and second output terminals of the first converter 118a1 across the capacitor $C_e$. This stage 118a1 also includes a first diode $D_1$ between the input terminals in parallel with a thyristor $T_1$ controlled by a zener diode $Z_1$ and an associated resistor $R_Z$, along with a blocking diode D2 to allow charging of the capacitor $C_e$ to provide an unregulated DC voltage $V_{Ce}$ at the first stage output terminals via charging current from the snubber capacitor flowing in the direction indicated by line 150. Moreover, as discussed further below with respect to FIG. 4, the supply circuit capacitor $C_e$ receives charging current along the path 150 from the snubber circuit 116a when the switching device voltage $V_{GCT}$ is positive and also when the switch voltage $V_{GCT}$ is negative.

The second converter stage 118a2 in this example is a flyback type DC-to-DC converter that converts the unregulated dc voltage on the capacitor $C_e$ to a regulated dc output voltage $V_{SD}$ for the gate driver 114, and includes a high-frequency step-down transformer X1 and a MOSFET switch Q1 operated in a closed loop fashion by a regulator controller 119, as well as output rectifier and filter components $D_3$ and $C_O$, respectively. The transformer X1 provides isolation between the SPS 118a and the gate driver 114 and thereby isolates the supplied voltage $V_{SD}$ from the snubber 116a and from the system ground. The second converter 118a2, moreover, is coupled with the output terminals of the first converter 118a1 to receive the first converter output voltage $V_{Ce}$ and to provide the electrical voltage $V_{SD}$ at the supply circuit output for operation of the switch driver 114, where the second converter 118a2 comprises an isolation circuit to electrically isolate the supply circuit output from the output terminals of the first converter.

Figure 4:
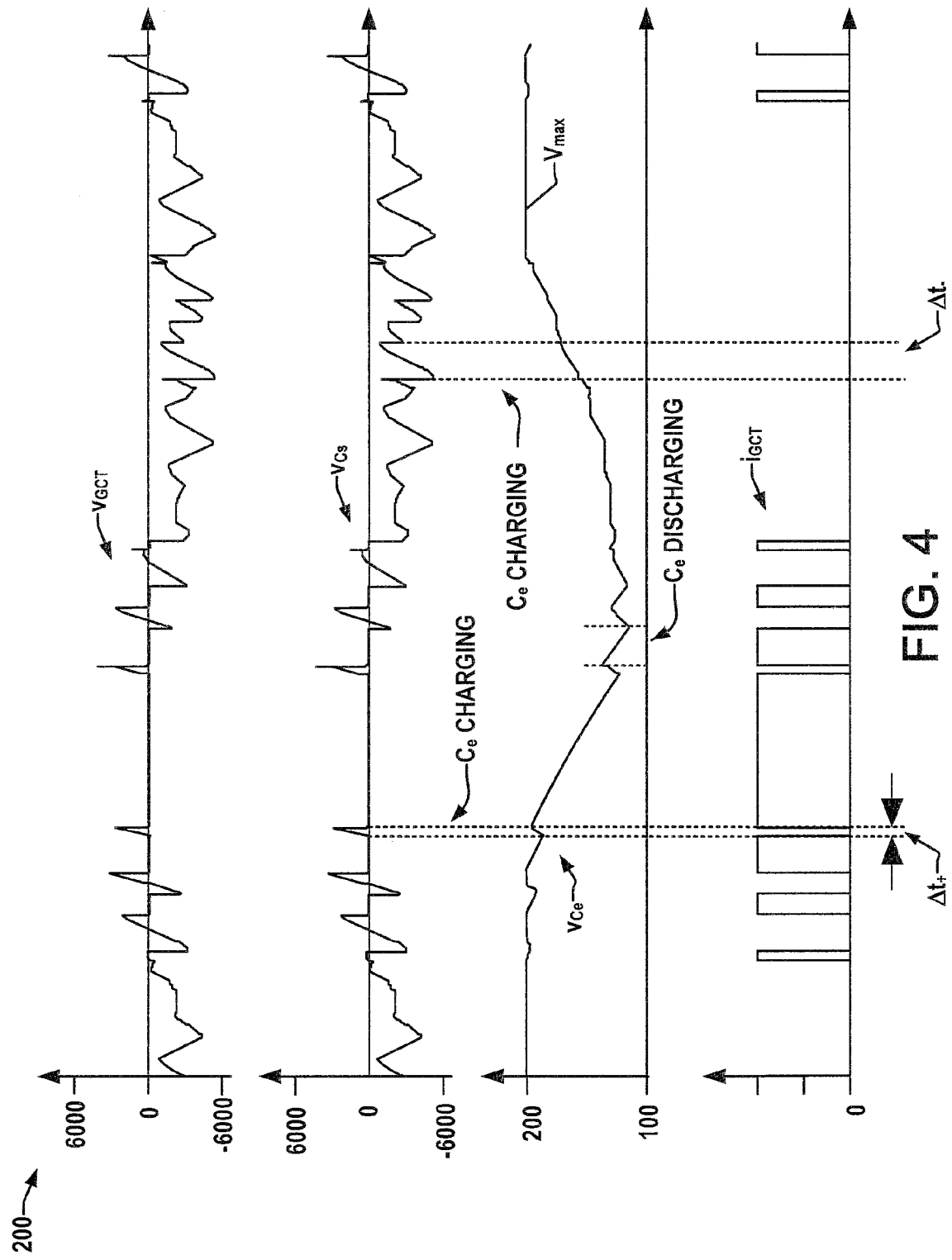
FIG. 4 is a graph illustrating various current and voltage waveforms in the switch circuit of FIG. 3, showing charging of the supply circuit capacitor in both positive and negative voltage polarity conditions of the switching device.

Referring now to FIGS. 3 and 4, a graph 200 in FIG. 4 illustrates exemplary waveforms for the GCT switch voltage $V_{GCT}$, the snubber capacitor voltage $V_{Cs}$, the supply capacitor voltage $V_{Ce}$ at the output of the first stage 118a1, and the switch current $I_{GCT}$ flowing through the switching device 112a during normal PWM operation of the circuit 110a under control of the switching control system 120 of FIG. 3. In this example, the system 102 operates at AC supply voltages ranging beyond about plus and minus 6000 volts for an exemplary current source rectifier converter 102 rated at 2300 volts and 0.4 MVA power. In this example, each switching device 112a is turned on (conductive state) for about 120 degrees and turned off (nonconductive) for about 240 degrees per fundamental-frequency cycle. When the switch 112a is on (conducting), the switch voltage $V_{GCT}$ is zero, whereas when the switch 112a is off, $V_{GCT}$ can be positive ($V_{GCT}>0$) or negative ($V_{GCT}<0$) as shown in the graph 200. The snubber capacitor voltage $V_{Cs}$ generally follows the switch voltage $V_{GCT}$ slowly due to the RC time constant of the snubber circuit 116a and the series connection thereof with the supply circuit 118a across the switch terminals. The essentially unregulated voltage $V_{Ce}$ across the energy storage capacitor $C_e$ in the supply circuit 118a varies as a function of the switch state, wherein with the switch 112a on, the capacitor $C_e$ delivers energy to the gate driver 114 through the second converter stage 118a2, and consequently, $V_{Ce}$ decreases. On the other hand, when the switch 112a is off, the capacitor $C_e$ will charge.

Moreover, the capacitor $C_e$ will advantageously receive charging current along the path 150 not only when the switch voltage is positive ($V_{GCT}$>0) but also when the switch voltage is negative ($V_{GCT}$<0). For instance, when the switch 112a turns off during the time period $\Delta t_+$ with $V_{GCT}$>0 shown in FIG. 4, the switch voltage $V_{GCT}$ starts to increase and the switch current $I_{GCT}$ will be diverted along the path 150 to the series circuit including the snubber circuit 116a and the supply circuit 118a. In this condition, the voltage $V_{Ce}$ across the energy storage capacitor $C_e$ increases to its maximum value $V_{max}$ (e.g., about 200 volts in one example) set by the values of the zener diode $Z_1$ and the resistor $R_Z$, causing the thyristor $T_1$ to turn on to divert the current from the capacitor $C_e$ to the thyristor $T_1$ with the diode $D_2$ reverse-biased to prevent $C_e$ from discharging through $T_1$. Similarly, when $V_{GCT}$<0, the capacitor $C_e$ will also be charged, as shown in the example time period when $V_{GCT}$<0. During $\Delta t$ of FIG. 4 when the switch voltage $V_{GCT}$ increases from −6200V to −1000V due to the operation of other switches 112 in the exemplary converter system 102. In this case, the voltage $V_{Cs}$ across the snubber capacitor $C_s$ has an initial voltage of −6200V and follows the switch voltage $V_{GCT}$ slowly due to the snubber RC time constant, with the absolute value of the snubber capacitor voltage $|V_{Cs}|$ remaining greater than the absolute value of the switch voltage $|V_{GCT}|$. Because $|V_{Cs}|>|V_{GCT}|$ during $\Delta t$, the input terminal voltage of the supply circuit 118a always remains positive (e.g., $V_{GCT}-V_{Cs}>0$), and once this input voltage is greater than the present energy storage capacitor voltage $V_{Ce}$, the snubber capacitor $C_s$ again begins to discharge and charging current flows from $C_s$ to $C_e$ along the path 150.

The illustrated second converter 118a2 of FIG. 3 is a flyback type regulated DC-to-DC converter that converts the unregulated DC capacitor voltage $V_{Ce}$ to regulated DC supply for the gate driver $V_{SD}$ (e.g., about 20 VDC in the illustrated example). The second converter 118a2 comprises a MOSFET switch Q1 which can include an integrated switch controller 119, and a high-frequency transformer X1 with an output rectifier diode $D_3$ and an output filter capacitor $C_O$. The output voltage is fed back to the controller 119 so as to provide closed-loop regulation of the DC output voltage $V_{SD}$ supplied to the switch driver 114. In this example, moreover, the transformer X1 is a step-down transformer which provides isolation between the RC snubber circuit 116a and the switch driver 114, wherein the controller 119 controls the MOSFET switch duty cycle at a given switching frequency according to the output voltage feedback so as to maintain the output $V_{SD}$ regulated at a generally constant value, such as about 20 VDC in this implementation.

The component sizes and values in the dual stage supply circuit 118a can be selected according to any required switch driver circuit supply voltage level $V_{SD}$, and according to the values of the snubber components $R_S$ and $C_S$ and the voltage levels in the converter 102, including steady state and transient startup conditions of the system 102. In this regard, the MOSFET controller 119 may provide particular voltage settings for converter startup $V_{start}$ and a minimum voltage $V_{min}$. When the supply capacitor voltage $V_{Ce}$ increases from zero at startup, the MOSFET gate signal is preferably disabled until $V_{Ce}$ exceeds the startup voltage value $V_{start}$. Thereafter, voltage variations in $V_{Ce}$ will not affect the operation of the MOSFET until $V_{Ce}$ transitions below the minimum value $V_{min}$, whereupon the MOSFET gating signal is again disabled, whereby the startup and minimum voltage values $V_{start}$ and $V_{min}$ effectively provide a hysteresis operation of the MOSFET Q1 which will be enabled again only when $V_{Ce}>V_{start}$. At startup of the power converter 102, moreover, the switching control signals CS are preferably inhibited by the switching control system 120 to allow adequate time for initially charging the capacitance of the switch driver circuits 114 by the supply circuits 118a.

The supply circuit storage capacitor $C_e$ operates to store energy obtained from the snubber 116a, wherein the stored energy in $C_e$ is given by the following equation (1)

$$E = \frac{1}{2} C_e V_{Ce}^2 \tag{1}$$

This energy level can be tailored according to the energy requirements of a given driver circuit 114, the efficiency of the second converter 118a2 and other application specifications. As seen in equation (1) above, increasing the stored energy E can be accomplished by increasing either $C_e$ or $V_{Ce}$, wherein the capacitor voltage $V_{Ce}$ is approximated by the following equation (2):

$$V_{Ce} = \frac{C_s}{C_e} V_{GCT} \tag{2}$$

neglecting a small voltage drop across the snubber resistor $R_S$ and assuming that the capacitance of the supply capacitor $C_e$ is much greater than that of the snubber capacitor $C_S$. Accordingly, for a given switch voltage $V_{GCT}$, increasing the value of the supply capacitor $C_e$ reduces $V_{Ce}$, and the values of $C_e$ and $V_{Ce}$ are preferably chosen so as to maximize the energy transfer from $C_s$ to $C_e$. In this regard, because the stored energy E in the supply circuit capacitor $C_e$ is proportional to the square of $V_{Ce}$, it is preferable to increase $V_{Ce}$ rather than increasing $C_e$ to maximize the energy transfer. The maximum power output $P_{O,max}$ of the supply circuit 118a can also be tailored according to a given switch driver application, wherein the maximum output power $P_{O,max}$ depends on the values of the snubber capacitor $C_s$, the supply circuit capacitor $C_e$, the maximum voltage $V_{max}$ set by zener diode $Z_1$, and the input supply voltage for the conversion system 102, among other factors, wherein the value of $P_{O,max}$ is preferably constant for a given set of parameters.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. A switch circuit for selectively controlling conduction of current between first and second circuit nodes of a power converter, the switch circuit comprising:
    a switching device having first and second switch terminals coupled with the first and second circuit nodes, respectively, and a control terminal receiving a switching signal to selectively operate the switching device in one of a conductive state and a nonconductive state for controlling the conduction of current between first and second circuit nodes;
    a switch driver having an output terminal coupled with the control terminal of the switching device and at least one power terminal for receiving power, the switch driver being operative to provide the switching signal according to a received switch control signal using power from the at least one power terminal;
    a snubber circuit having a snubber storage device and first and second snubber terminals with one of the snubber terminals being coupled with one of the first and second circuit nodes; and
    a supply circuit comprising;
        a supply storage device,
        an output coupled with the switch driver power terminal to provide electrical power from the supply storage device to the switch driver for operation of the switch driver,
        first and second input terminals with one of the input terminals being coupled with the other one of the first and second circuit nodes and the other input terminal being coupled with the other one of the snubber terminals with the supply circuit and the snubber circuit forming a series circuit between the first and second circuit nodes in parallel with the switching device,
        a first converter coupled with the first and second supply circuit input terminals, the first converter comprising a capacitor storage device receiving charging current from the snubber circuit to provide a first converter output voltage at first and second output terminals of the first converter, and
        a second converter coupled with the output terminals of the first converter to receive the first converter output voltage and providing the electrical power at the supply circuit output for operation of the switch driver, the second converter comprising an isolation circuit to electrically isolate the supply circuit output from the output terminals of the first converter.

2. The switch circuit of claim 1, wherein the switching device is a gate commutated thyristor with a gate control terminal receiving the switching signal from the switch driver.

3. The switch circuit of claim 1, wherein the snubber circuit comprises a snubber resistor and a snubber capacitor coupled in series between the first and second snubber terminals.

4. The switch circuit of claim 1, wherein the second converter is a flyback converter.

5. The switch circuit of claim 1, wherein the capacitor storage device of the first converter receives charging current from the snubber circuit when a voltage across the first and second switch terminals of the switching device is positive and also receives charging current from the snubber circuit when the voltage across the first and second switch terminals of the switching device is negative.

6. The switch circuit of claim 1, wherein the supply storage device of the supply circuit receives charging current from the snubber circuit when a voltage across the first and second switch terminals of the switching device is positive and also receives charging current from the snubber circuit when the voltage across the first and second switch terminals of the switching device is negative.

7. The switch circuit of claim 1, wherein the switch driver and the switching device are integrated.

8. The switch circuit of claim 1, wherein the switching device is a gate commutated thyristor with a gate control terminal receiving the switching signal from the switch driver, and wherein the switch driver and the switching device form an integrated gate commutated thyristor.

9. A power conversion system, comprising:
    an input for receiving input electrical power;
    an output for providing output electrical power;
    a switching system comprising a plurality of switch circuits coupled with the input and the output to selectively provide power from the input to the output according to a plurality of switch control signals, the individual switch circuits comprising:
        a switching device having first and second switch terminals coupled with the circuit nodes associated with the input and the output, and a control terminal receiving a switching signal to selectively operate the switching device in one of a conductive state and a nonconductive state to control the provision of power from the input to the output;
        a switch driver having an output terminal coupled with the control terminal of the switching device and at least one power terminal for receiving power, the switch driver being operative to provide the switching signal according to a corresponding switch control signal using power from the at least one power terminal;
        a snubber circuit having a snubber storage device and first and second snubber terminals with one of the snubber terminals being coupled with one of the circuit nodes; and
        a supply circuit comprising:
            a supply storage device,
            an output coupled with the switch driver power terminal to provide electrical power from the supply storage device to the switch driver for operation of the switch driver,
            first and second input terminals with the supply circuit and the snubber circuit forming a series circuit between the circuit nodes in parallel with the switching device,
            a first converter coupled with the first and second supply circuit input terminals, the first converter comprising a capacitor storage device receiving charging current from the snubber circuit to provide a first converter output voltage at first and second output terminals of the first converter, and
            a second converter coupled with the output terminals of the first converter to receive the first converter output voltage and providing the electrical power at the supply circuit output for operation of the switch driver, the second converter comprising an isolation circuit to electrically isolate the supply circuit output from the output terminals of the first converter.

10. The power conversion system of claim 9, wherein the switching devices are gate commutated thyristors individually comprising a gate control terminal receiving the switching signal from the switch driver.

11. The power conversion system of claim 9, wherein the snubber circuit comprises a snubber resistor and a snubber capacitor coupled in series between the first and second snubber terminals.

12. The power conversion system of claim 9, wherein the power conversion system is a current source rectifier receiving AC input power and providing DC output power.

13. The power conversion system of claim 9, wherein the second converter is a flyback converter.

14. The power conversion system of claim 9, wherein the capacitor storage device of the first converter receives charging current from the snubber circuit when a voltage across the first and second switch terminals of the switching device is positive and also receives charging current from the snubber circuit when the voltage across the first and second switch terminals of the switching device is negative.

15. The power conversion system of claim 12, wherein the supply storage device of the supply circuit receives charging current from the snubber circuit when a voltage across the first and second switch terminals of the switching device is positive and also receives charging current from the snubber circuit when the voltage across the first and second switch terminals of the switching device is negative.

16. The power conversion system of claim 9, wherein the supply storage device of the supply circuit receives charging current from the snubber circuit when a voltage across the first and second switch terminals of the switching device is positive and also receives charging current from the snubber circuit when the voltage across the first and second switch terminals of the switching device is negative.

17. A switch circuit for selectively controlling conduction of current between first and second circuit nodes of a power converter, the switch circuit comprising:
  a switching device having first and second switch terminals coupled with the first and second circuit nodes, respectively, and a control terminal receiving a switching signal to selectively operate the switching device in one of a conductive state and a nonconductive state for controlling the conduction of current between first and second circuit nodes;
  a switch driver having an output terminal coupled with the control terminal of the switching device and at least one power terminal for receiving power, the switch driver being operative to provide the switching signal according to a received switch control signal using power from the at least one power terminal;
  a snubber circuit having a snubber storage device and first and second snubber terminals with a first snubber terminal directly connected to one of the first and second circuit nodes; and
  a supply circuit having a supply storage device, an output coupled with the switch driver power terminal to provide electrical power from the supply storage device to the switch driver for operation of the switch driver, and first and second input terminals with the first input terminal directly connected to the other one of the first and second circuit nodes and the second input terminal being directly connected to the second snubber terminal with the supply circuit and the snubber circuit forming a series circuit between the first and second circuit nodes in parallel with the switching device.

18. The switch circuit of claim 17, wherein the supply circuit comprises:
  a first converter coupled with the first and second supply circuit input terminals, the first converter comprising a capacitor storage device receiving charging current from the snubber circuit to provide a first converter output voltage at first and second output terminals of the first converter; and
  a second converter coupled with the output terminals of the first converter to receive the first converter output voltage and providing the electrical power at the supply circuit output for operation of the switch driver, the second converter comprising an isolation circuit to electrically isolate the supply circuit output from the output terminals of the first converter.

19. The switch circuit of claim 17, wherein the supply storage device of the supply circuit receives charging current from the snubber circuit when a voltage across the first and second switch terminals of the switching device is positive and also receives charging current from the snubber circuit when the voltage across the first and second switch terminals of the switching device is negative.

20. The switch circuit of claim 17, wherein the switch driver and the switching device are integrated.

* * * * *